United States Patent

[11] 3,573,854

[72] Inventors William J. Watson;
William D. Kastner, Richardson, Tex.
[21] Appl. No. 781,071
[22] Filed Dec. 4, 1968
[45] Patented Apr. 6, 1971
[73] Assignee Texas Instruments Incorporated
Dallas, Tex.

[54] LOOK-AHEAD CONTROL FOR OPERATION OF PROGRAM LOOPS
7 Claims, 5 Drawing Figs.

[52] U.S. Cl. .......... 340/172.5
[51] Int. Cl. .......... G06f 9/12
[50] Field of Search .......... 340/172.5; 235/157

[56] References Cited

UNITED STATES PATENTS

| | | | |
|---|---|---|---|
| RE26,087 | 9/1966 | Dunwell et al. | 340/172.5 |
| 3,292,153 | 12/1966 | Barton et al. | 340/172.5 |
| 3,312,951 | 4/1967 | Hertz | 340/172.5 |
| 3,401,376 | 9/1968 | Barnes et al. | 340/172.5 |

*Primary Examiner*—Paul J. Henon
*Assistant Examiner*—Harvey E. Springborn
*Attorneys*—Samuel M. Mims, Jr., James O. Dixon, Andrew M. Hassell, Harold Levine, Rene E. Grossman, Melvin Sharp and Richards, Harris and Hubbard

ABSTRACT: A look-ahead system for a digital computer is disclosed. This digital computer has programmed instructions stored in and retrievable from a memory. Instruction streams from the memory are passed seriatim through a plurality of instruction registers for processing the instructions. A preliminary decoder senses a look-ahead instruction in the instruction stream and a look-ahead counter responds to the decoding of a look-ahead instruction in the preliminary decoder to establish an index in the look-ahead counter. The index in the look-ahead counter is decremented upon the appearance of each subsequent instruction in the instruction stream at the preliminary decoder. There is a branch decoder which is operable in the instruction processing registers following the preliminary decoder for sensing the conditional branch instruction in the instruction stream. A present address register indicates a present address of the instruction to be processed through the instruction processing registers. A third decoder responds to the contents of the present address register to control the supply of instructions in series to the instruction registers. A branch register responds to predetermined conditions in the present address register and the index in the counter to establish in a look-ahead register an address in the memory for the look-ahead instruction in the instruction stream to control the repeat of the fetch of the look-ahead instruction from memory.

INVENTORS:
WILLIAM D. KASTNER
WILLIAM J. WATSON

ATTORNEY

LOOK-AHEAD CONTROL FOR OPERATION OF PROGRAM LOOPS

This invention relates to a look-ahead logic pipeline for a look-ahead operation of a digital computer wherein instructions are stored and retrievable from memory in blocks of several instructions and provides logic which will assure the interruption of processing of a stream of instructions at a conditional branch instruction and the return to an upstream look-ahead instruction.

In high speed, electronic digital computers, the time spent by an arithmetic unit waiting for an operand may be greatly reduced by looking several instructions ahead of the instruction currently being executed. When properly executed, look-ahead operations may serve to match the speed of a computer memory to the speed of an arithmetic unit.

Look-ahead systems have heretofore been described. For example, a prior look-ahead system is described in PLANNING A COMPUTER SYSTEM, by Buchholz, McGraw Hill, 1962, Chapter 15, Page 288 et seq. Further, U.S. Pat. No. 3,401,376 includes a look-ahead system which is capable of selectively performing only that future work which will be used and does not perform advanced computations which will be unnecessary due to an unforeseen branching of the program.

The present invention provides a look-ahead system in a computer of the type described and claimed in the application of Watson et al. entitled MEMORY BUFFER FOR VECTOR STREAMING, Ser. No. 744,190, filed Jul. 11, 1968, wherein a system is provided with a memory system in which data words are stored in simultaneously retrievable groups of $N$ words per access cycle. An arithmetic unit which is provided for processing data words in a time interval which is less than the period of one memory access cycle and a buffer system is provided for receiving the groups of $N$ words at a time from memory with provision for transferring the words from the buffer system to the arithmetic unit serially and at intervals less than the period of the memory cycle.

The present invention provides look-ahead logic particularly useful in the computer described and claimed in the above-identified application. A description of the invention in connection with such computer is included herein to illustrate the general applicability of the invention.

In accordance with one embodiment of the invention, a three level pipeline of instruction storage registers is interposed in the channel leading from memory to a central processor. At one level a decoder senses a conditional branch instruction to transfer from a branch register the address of a look-ahead instruction which precedes the branch instruction. A decoder earlier in the stream senses any look-ahead instruction to establish a counter index. The look-ahead counter decrements as each instruction is fetched between a look-ahead instruction and a branch point instruction.

An incrementing present address register stores the address of the instruction currently being fetched.

A transfer means responsive to the count of the look-ahead counter transfers the look-ahead instruction address from the branch register to the look-ahead address register.

Means responsive to the appearance of the look-ahead address in the look-ahead address register is provided for fetching the block of instructions from memory which includes the look-ahead instruction.

For a more complete understanding of the invention and for further objects and advantages thereof, reference may now be had to the following description taken in conjunction with the accompanying drawings in which.

In order to understand the present invention, an advanced scientific computer system in which the present invention is particularly useful will first be described and the role of the present invention and its interreaction with other components of the system will then be explained.

FIG. 1

Figure 1:
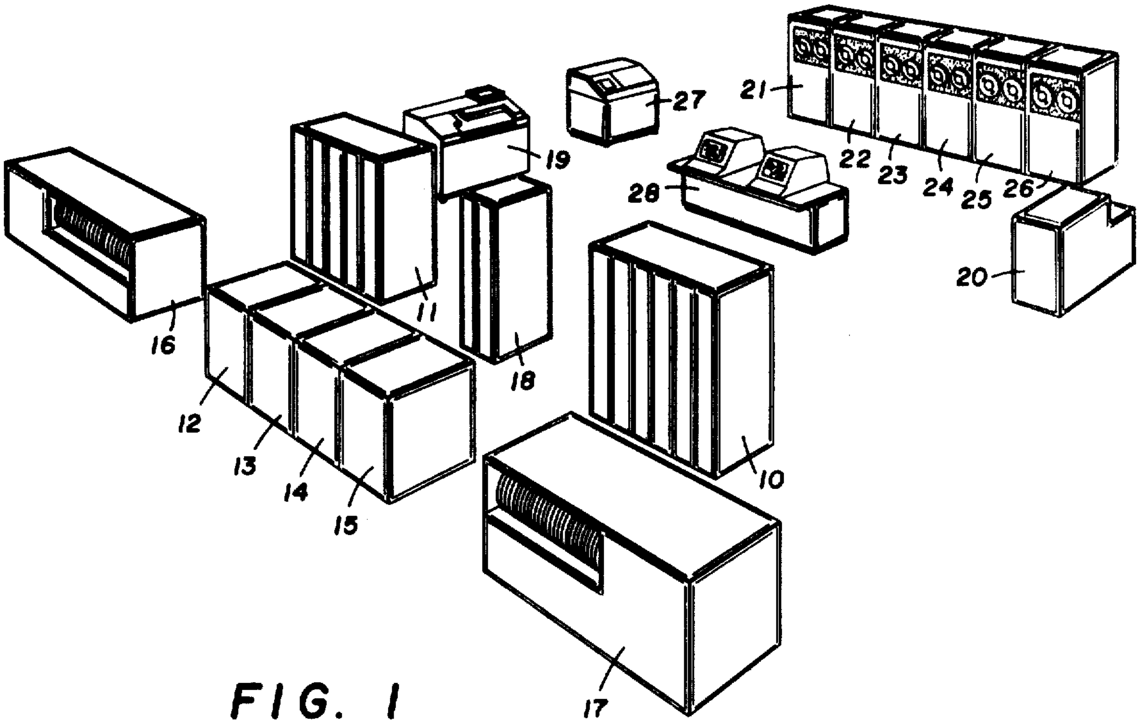
FIG. 1 illustrates a preferred arrangement of components of a computer system.

Referring to FIG. 1, the computer system includes a central processing unit (CPU) 10 and a peripheral processing unit (PPU) 11. Memory is provided for both CPU 10 and PPU 11 in the form of four modules of thin film storage units 12—15. Such storage units may be of the type known in the art. In the form illustrated, each of the storage modules stores 16,384 words.

The memory provides for 160 nanosecond cycle time and on the average 100 nanosecond access time. Memory words of 256 bits each are divided into 8 zones of 32 bits each. Thus, the memory words are stored in blocks of 8 words in each of the 256-bit memory words, or 2,048 groups per module.

In addition to storage modules 12—15, rapid access disc storage modules 16 and 17 are provided wherein the access time on the average is about 16 milliseconds.

A memory control unit 18 is also provided for control of memory operation, access and storage.

A card reader 19 and a card punch unit 20 are provided for input and output. In addition, tape units 21—26 are provided for input/output (I/O) purposes as well as storage. A line printer 27 is also provided for output service under the control of the PPU 11.

The processor system has a memory or storage hierarchy of four levels. The most rapid access storage is in the CPU 10. The next most rapid access is in the thin film storage units 12—15. The next most available storage is the disc storage units 16 and 17. Finally, the tape units 21—26 complete the storage array.

A twin cathode-ray tube (CRT) monitor console 28 is provided. The console 28 consists of two adapted CRT-keyboard terminal units which are operated by the PPU 11 as input/output devices. It can also be used through an operator to command the system for both hardware and software checkout purposes and to interact with the system in an operational sense, permitting the operator through the console 28 to interrupt a given program at a selected point for review of any operation, its progress or results, and then to determine the succeeding operation. Such operations may involve the further processing of the data or may direct the unit to undergo a transfer in order to operate on a different program or on different data.

FIG. 2

Figure 2:
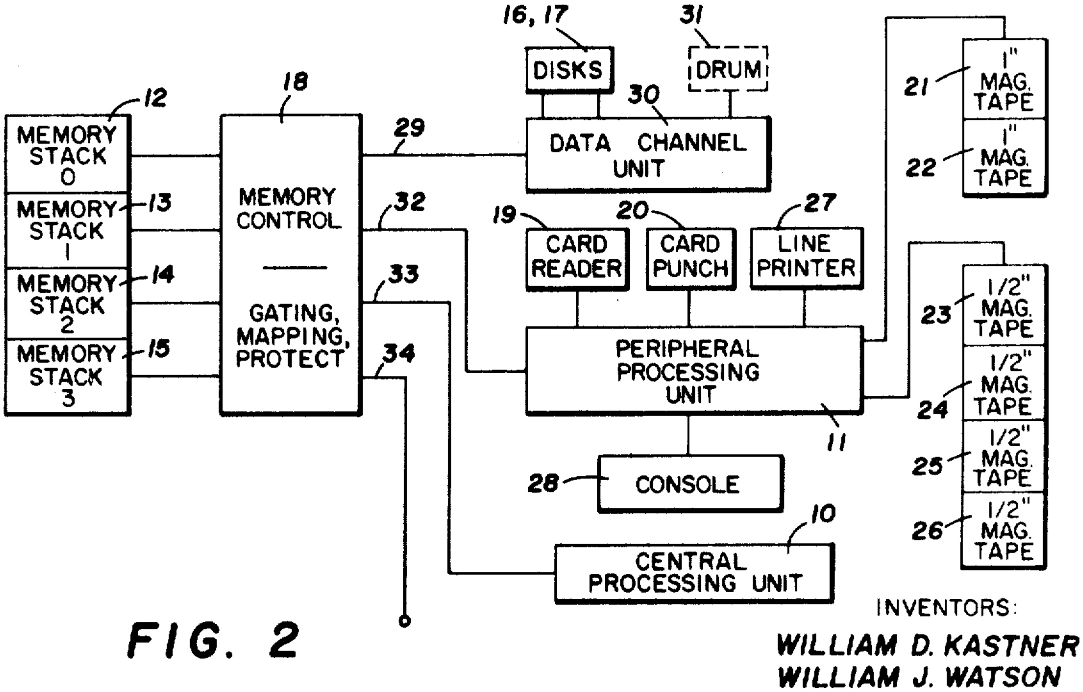
FIG. 2 is a block diagram of the system of FIG. 1.

The organization of the computer system is shown in greater detail in FIG. 2. Memory stacks 12—15 are controlled by memory control 18 in order to input or output word data to and from the memory stacks. Additionally, memory control 18 provides gating, mapping, and protection of the data within the memory stacks as required.

A signal bus 29 extends between the memory control 18 and a buffered data channel unit 30 which is connected to the discs 16 and 17. The data channel unit 30 has for its sole function the support of the memory shown as discs 16 and 17 and is a simple wired program computer capable of moving data to and from memory discs 16 and 17. Upon command only, the data channel unit 30 may move memory data from the discs 16 and 17 via the bus 29 through the memory control 18 to the memory stacks 12—15.

Two bidirectional channels extend between the discs 16 and 17 and the data channel unit 30, one channel for each disc unit. For each unit, only one data word at a time is transmitted between that unit and the data channel unit 30. Data from the memory stacks 15—18 are transmitted to and from the data channel 30 in the memory control 18 in eight-word blocks.

A magnetic drum memory 31 (shown dotted), if provided, may be connected to the data channel unit 30 when it is desired to expand the memory capability of the computer system.

A single bus 32 connects the memory control 18 with the PPU 11. PPU 11 operates all I/O devices except the discs 16 and 17. Data from the memory stacks 12—15 are processed to and from the PPU via the memory control 18 in eight-word blocks.

When read from memory, a read/restore operation is carried out in the memory stack. The eight words are "Funneled down" with only one of the eight words being used within the PPU 11. This "funneling down" of data words within the PPU 11 is desirable because of the relatively slow usage of data required by the PPU 11 and the I/O devices, as compared with the CPU 10. A typical available word transfer rate for an I/O device controlled by the PPU 11 is about 100 kilowords per second.

The PPU 11 contains eight virtual processors therein, the majority of which may be programmed to operate various ones of the I/O devices as required. The tape units 21 and 22 operate upon a 1-inch wide magnetic tape while the tape units 23—26 operate with ½-inch magnetic tapes to enhance the capabilities of the system.

The PPU 11 operates upon the program contained in memory and executed by virtual processors in a most efficient manner and additionally provide monitoring controls to programs being run in the CPU 10.

CPU 10 is connected to memory stacks 12—15 through the memory control 18 via a bus 33. The CPU 10 may utilize all eight words in a word block provided from the memory stacks 12—15. Additionally, the CPU 10 has the capability of reading or writing any combination of those eight words. Bus 33 handles three words every 50 nanoseconds, two words input to the CPU 10 and one word output to the memory control 18.

A bus 34 is provided from the memory control 18 to be utilized when the capabilities of the computer system are to be enlarged by the addition of other processing units and the like.

Each of the buses 29, 32, 33 and 34 is independently gated to each memory module, thereby allowing memory cycles to be overlapped to increase processing speed. A fixed priority preferably is established in the memory controls to service conflicting requests from the various units connected to the memory control 18. The internal memory control 18 is given the highest priority, with the external buses 29, 32, 33 and 34 being serviced in that order. The external bus-processor connectors are identical allowing the processors to be arranged in any other priority order desired.

FIG. 3

The CPU 10 has the capability of processing data at a rate which substantially exceeds the rate at which data can be fetched from and stored in memory. Therefore, in order to accommodate the memory system and its operation to take advantage of the maximum speed capable in the CPU 10 for treatment of large sets of well ordered data, as in vector operations, a particular form of interfacing is provided between the memory and the AU together with compatible control. The system employs a memory buffer unit schematically illustrated in FIG. 3 where the memory stacks are connected through the central memory control unit 18 to the CPU 10. The CPU 10 includes a memory buffer unit 100 and a vector arithmetic unit 101. The channel 33 interconnects the memory control 18 with CPU 10, particularly with the buffer unit 100. Three lines, 100*a*, 100*b* and 100*c* serve to connect the memory buffer unit 100 to the arithmetic unit 101. The line 100*c* serves to return the result of the operations in the unit 101 to the memory buffer unit and thence through memory control to the central memory stacks 12—15.

FIG. 4

Figures 3, 4:
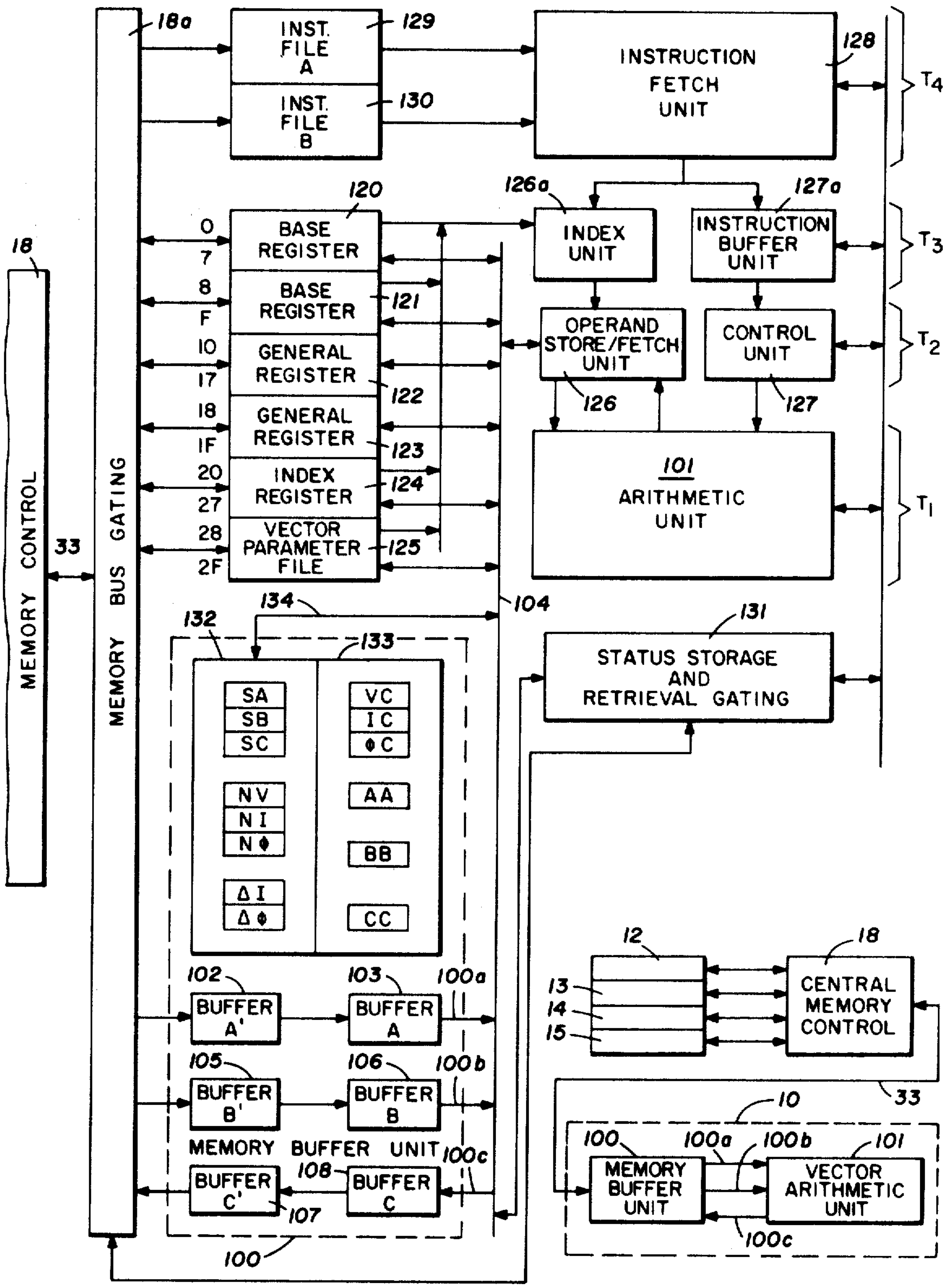
FIG. 3 illustrates the flow of instructions and data to an arithmetic unit.
FIG. 4 is a block diagram of the central processor unit of FIGS. 1—3.

FIG. 4 illustrates in greater detail and in a functional sense the nature of the memory buffer unit employed for high speed communication to and from the arithmetic unit.

As previously described, memory storage in the present system is in blocks of 256 bits with eight 32-bit words per block. Such data words are then accessed from memory by way of the central memory control 18 and thence by way of channel 33 to a memory bus gating unit 18*a*. As above mentioned, the memory buffer unit 100 is structured in three channels. The first channel includes buffer units 102 and 103 in series between the gating unit 18*a* and the input/output bus 104 for the AU 101. Similarly, the second channel includes buffer units 105, 106 and the third channel includes units 107 and 108. The first and second channels provide paths for operands delivered to the AU 101 and the buffer units 107 and 108. The third channel provides for transmittal of the results to the central memory unit.

The buffer unit 102 is constructed to receive and store groups of eight words at a time. One group is received for each eight clock pulses. Each group is transferred to buffer unit 103 in synchronism with buffer 102. Words of 32 bits are transferred from buffer unit 103 to the AU 101 one word at a time, one word for each clock pulse. It will be recognized that, depending upon the nature of the operation carried out by the unit 101, one result may be transferred via buffers 108 and 107 to memory for each clock pulse. The system is capable of such high utilization operations as well as operations at less demanding rates. An example of the maximum demand on the buffering operation and the arithmetic unit would be a vector addition where two operands would be applied to the arithmetic unit 101 from units 103 and 106 for each clock pulse and one sum would be applied from the arithmetic unit 101 to the buffer unit 108 for each clock pulse.

The system of FIG. 4 also includes a file of addressable registers including base registers 120, 121, general registers 122, 123 and index register 124 and a vector parameter file 125. Each of the registers 120—125 is accessible to the arithmetic unit 101 by way of the bus 104 and the operand store and fetch unit 126. An arithmetic control unit 127 is also provided to be responsive to an instruction buffer unit 127*a*. An index unit 126*a* operates in conjunction with the instruction buffer unit 127*a* on instructions received from unit 128. Instruction files 129 and 130 provide paths for flow of instructions from central memory to the instruction fetch unit 128.

A status storage and retrieval gating unit 131 is provided with access to and from all of the units in FIG. 4 except the instruction files 129 and 130. It also communicates with the memory bus gating unit 18*a*. It is the operation of the status storage and retrieval gating unit 131 that causes the status of the entire CPU 10 to be transferred to memory and a new status introduced into the CPU 10 for initiation of operations under a new program.

A memory buffer control storage file is provided in the memory buffer unit 100. The file includes a parameter register file 132 and a working storage register file 133. The parameter file is connected by way of a channel 134 and bus 104 to the vector parameter file 125. The contents of the vector parameter file are transferred into the memory buffer control storage file 132 in response to fetching of a generic vector instruction from memory into unit 128. By way of illustration, assume the acquisition of such a generic vector instruction by unit 128. A transfer is immediately carried out, in machine language, transferring the parameters from the file 125 to the file 132.

Meanwhile, the instruction operations then being executed in stages 126*a*, 127*a* and 126, 127 of the CPU 10, in effect are pipelined. More particularly, during the interval that the AU 101 is performing a given operation, the units 126 and 127 prepare for the next succeeding operation to be carried out by AU 101. During the same time interval, the units 126*a* and 127*a* are preparing for the next succeeding operation to be carried out by units 126 and 127. During this same interval, the instruction fetch unit 128 is fetching the next instruction. This is the instruction to be executed three operations later by the AU 101. Thus, in this effective pipeline structure, there are four instructions under process simultaneously, one at each of levels $T_1$, $T_2$, $T_3$, and $T_4$, FIG. 4.

FIG. 5

Figure 5:
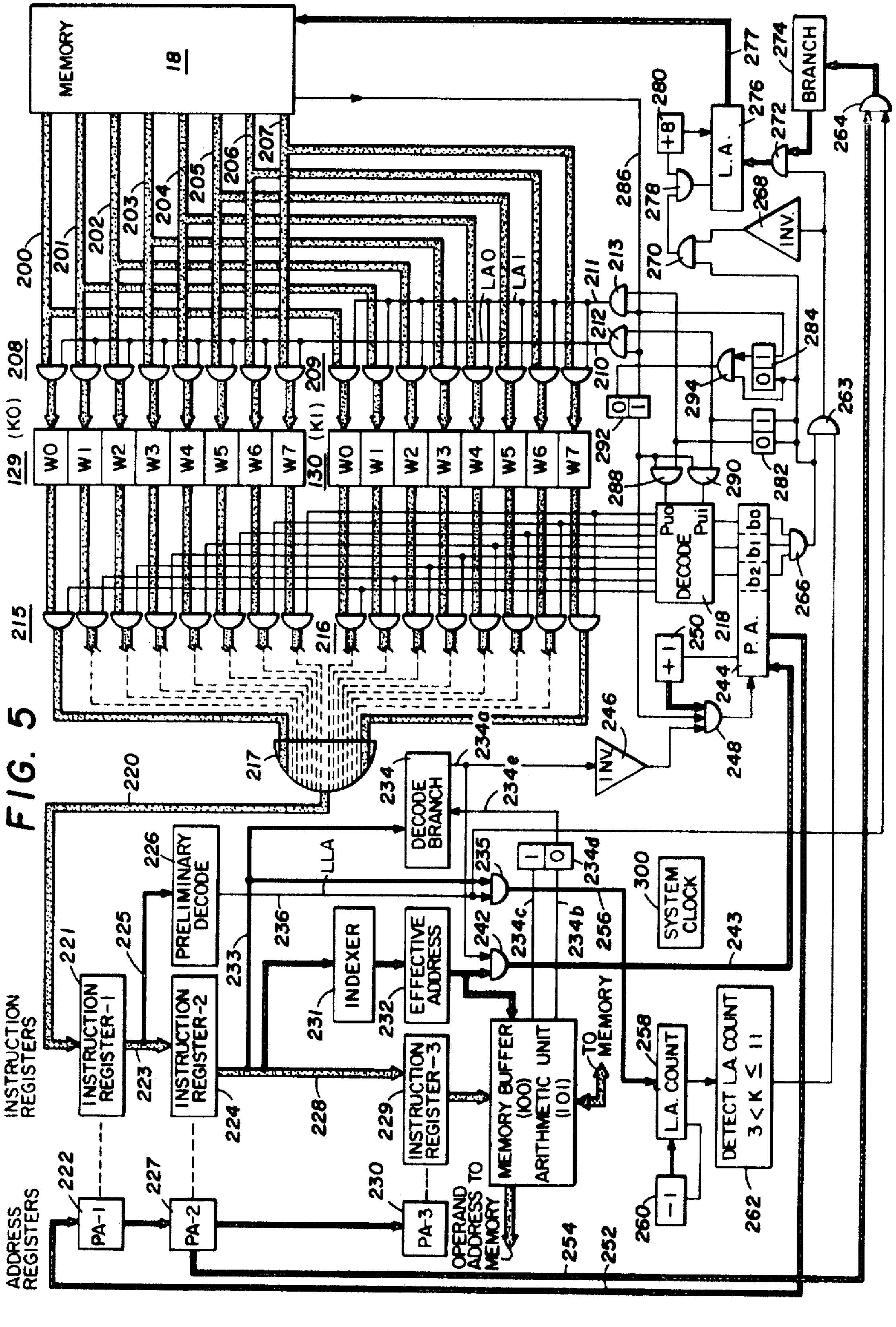
FIG. 5 illustrates the present invention.

It will now be seen, by reference to FIG. 5, that there is superimposed a further instruction processing pipeline for look-ahead purposes. The present invention is directed to the look-ahead logic. In FIG. 5 a KO instruction file 129 and a K1 instruction file 130 are shown together with the gating controls therefor in a setting wherein the look-ahead operation is provided. The system of FIG. 5 will be described in connection with an example wherein a look-ahead instruction is to be located ahead of the point in an instruction list that such conditional branch is to be executed. The system proceeds through the instruction list until a conditional branch instruction is encountered and in response thereto a block of instruction words containing the look-ahead instruction will be fetched in order to provide an uninterrupted flow of instructions to a processing unit such as the arithmetic unit 101 of FIG. 4. The program example to be used is set out in the following table.

TABLE I

| Instruction location in memory | Instruction |
|---|---|
| 103 | LLA-18 |
| 104 | X04 |
| 105 | X05 |
| 106 | X06 |
| 107 | X07 |
| 108 | X08 |
| 109 | X09 |
| 10A | X0A |
| 10B | XOB |
| 10C | XOC |
| 10D | XOD |
| 10E | XOE |
| 10F | XOF |
| 110 | X10 |
| 111 | X11 |
| 112 | X12 |
| 113 | X13 |
| 114 | X14 |
| 115 | [1] X15 |
| 116 | X16 |
| 117 | X17 |
| 11A | X1A |
| 11B | |
| 11C | |
| 11D | |

[1] Conditional branch to 103.

In Table I only a portion of the instruction stream has been included, namely the portion between addresses 103 and 11D. At address 103 the contents comprises an instruction LLA-18 which means that this instruction is a load look-ahead instruction, a conditional branch instruction being inserted into the program stream 18 instructions later, i.e., at memory address 115.

In Table I, the instruction locations in memory (Column 1) are identified in octal-decimal notation and are divided into blocks of eight words. The first octet of instructions is located in memory at instruction locations 100—107. The second octet is at memory locations 108—10F. The third octet is at memory locations 110—117.

For the purpose of illustration, a look-ahead instruction 11A is inserted in the program at memory location 103. Instruction 11A indicates to the look-ahead system that it should look ahead 18 memory locations, i.e. to memory location 115 for a conditional branch instruction. The conditional branch instruction at memory location 115 directs the operation to return to instruction 103 so that an iterative loop may be executed repeatedly until the branch condition is satisfied, whereupon the computer will proceed past the instruction at location 115 to succeeding instructions in the list.

The present invention is primarily useful in the processing of instruction loops. It is well known that the overhead time spent due to an occasional wrong guess at the look-ahead level would be low. However, if this is multiplied by a large number of turns in a program loop, the overhead can be substantial. The present invention enhances the utility of a look-ahead operation responding to the existence of an instruction which is inserted in the instruction stream immediately preceding the first instruction in the loop. The response to the look-ahead instruction has no effect on the control of the loop. It does, however, require response of the look-ahead system such that the 18th instruction following look-ahead instruction is a conditional branch for which look-ahead mechanism should provide response to instructions along the branch path rather than continuing further down the instruction list beyond the 18th instruction.

The location of the look-ahead instruction is stored and then used when the look-ahead system has proceeded in its response through the 18 instructions. The response relates only to look-ahead and not to actual control of the program loop.

On the last turn of the program loop, the look-ahead control again returns to the look-ahead instruction. However, when the execution of instruction 115 dictates that the actual program execution should proceed downstream, the condition having been satisfied, means are provided for resetting the look-ahead mechanism, thereby ignoring those instructions fetched under control of the look-ahead mechanism. The look-ahead system is then redirected downstream and responds to downstream instructions thereafter until the next look-ahead instruction is encountered. This response is such that any exit from the loop will cause the look-ahead system to be reset.

In the system of FIG. 5, the eight instruction words of each 256-bit group are stored by way of channels 200—207 in instruction file registers 129 and by way of gates in a first bank 208. The second group of eight instruction words will be stored in instruction file registers 130 by way of gates in a bank 209. The gates 208 and 209 are controlled by signals on lines 210 and 211, respectively, leading from AND gates 212 and 213, respectively. The registers 129 are connected by way of a bank of gates 215 to an OR gate 217. The instruction file registers 130 are connected to gate 217 by way of gates in a bank 216. The gates in banks 208 and 209 are opened and closed alternately with the gates in each bank being actuated in parallel. In contrast, the gates in banks 215 and 216 are actuated sequentially in response to clocked output of a decoder unit 218. The channels 200—207, shown in FIG. 5 in a broad gauge, and all like lines in FIG. 5, are 32-bit lines, transmitting 32 bits of each word in parallel. Gates 208 and 209, registers 129 and 130 and gates 215 and 216 have capacity for parallel handling of 32 bits. In contrast, channels 210 and 211 shown in very narrow gauge, are single bit lines. Channels such as channel 243 of first intermediate gauge, FIG. 5, have 24-bit capacity and channels such as channel 233 of second intermediate gauge, 8-bit capacity.

The OR gate 217 is connected by way of channel 220 to an instruction register 221. A register 222 serves to store the address in memory in which the instruction stored in register 221 is located. The register 221 is connected by way of channel 223 to an instruction register 224 and by way of channel 225 to a preliminary decode register 226. A register 227 stores the address in memory of the instruction in register 224.

Instruction register 224 is connected by way of channel 228 to an instruction register 229, the address in memory for which is stored in register 230. The contents of the address of the instruction in register 229 normally would be fed through memory gating unit 18a FIG. 4 to the memory buffer 100 and the arithmetic unit 101.

Register 224 is also connected by way of indexer 231 to an effective address register 232 and by way of an 8-bit channel 233 to a decode branch unit 234 and to an AND gate 235. AND gate 235 is connected to the output of decode unit 226 by way of channel 236 which also is connected to an AND gate 264.

The effective address register 232 and the decode branch unit 234 are connected to an AND gate 242, the output of which is connected to transmit by way of channel 243 a branch address of 24 bits to a present address register 244. The decode branch unit 234 is connected by way of an inverter 246 and an AND gate 248 to the present address register 244. The other input of AND gate 248 is supplied by way of unit 250 which increments the address in register 244. The register 244 is connected by way of channel 252 to the input to the register 222. The register 227 is connected by way of channel 254 to the second input of AND gate 264.

The output of AND gate 235 is connected by way of channel 256 to the input of a look-ahead counter unit 258 which is provided with a decrement source 260. The look-ahead counter is connected by way of a comparator 262 which provides an output to AND gate 263 when the count in the look-ahead counter 258 is more than 3 and less than 11.

The last three digits in the address in the present address register 244 are decoded in unit 218 sequentially to transfer instructions from registers 129 and 130. The last three bits in the register 244 are also ANDed by way of unit 266 to supply the second input of the AND gate 263. The output of AND gate 263 is inverted to an inverter 268 and applied to an AND gate 270 the second input of which is supplied from the output of AND gate 266. AND gate 263 also supplies one input to an AND gate 272 the second input is supplied from the branch address register 274 which is actuated in response to the output of AND gate 264. AND gate 272 is connected to the look-ahead address register 276 which has a control input supplied by an AND gate 270 through AND gate 278 which AND gate is also fed by an incrementing unit 280 which adds eight counts to the look-ahead address each time the proper three digits are present in the last three bits in register 244. Unit 276 is connected to memory 18 by way of channels 277.

The output of AND gate 266 is also applied to both inputs of a flip-flop 282 and to the zero input of a second flip-flop 284. The one input of flip-flop 284 is connected to a line 286 which signals that memory data is available for transfer to file register 129 or 130.

The zero output of flip-flop 282 is connected to one input of an AND gate 288 and the one output is connected to one input of an AND gate 290.

AND gates 288 and 290 provide additional decode information to unit 218. The second input to AND gates 228 and 290 are supplied by the one output of a flip-flop 292, which output also is connected to the third input of AND gate 248.

Flip-flop 292 is connected at its one input to line 286. An AND gate 294 drives the zero input of flip-flop 292. AND gate 294 has one input connected to the output of gate 266 and the other input to the one output of flip-flop 284.

The system of FIG. 5 is one embodiment of the invention adopted to be wired as a fixed circuit for use in look-ahead operations responsive to a look-ahead instruction and a conditional branch instruction. It will be recognized that variations may be made in the specific arrangement and components thereof in applying the invention to other computer systems.

It will be noted that the preliminary decode unit 226 serves to decode the presence of a look-ahead instruction at level 1 of the three level instruction processing pipeline. The decode branch unit 234 decodes the presence of a conditional branch instruction at level 2 of the pipeline and thus applies a signal by way of line 234*a* to the AND gate 242 and to the inverter 246. This places a zero state on one input of AND gate 248 preventing further incrementing of register 244 and permitting transfer of the effective address from unit 232 to register 244. Such a transfer takes place on each cycle of the instruction loop until the condition prescribed by the conditional branch instruction has been satisfied. This condition is sensed by the arithmetic unit 101 in a conventional manner to provide flags on lines 234*b* and 234*c* leading to a flip-flop 234*d*. When the line 234*e* is in the zero state the condition is not satisfied and the program loop will be followed. However, when the output of the flip-flop 234*d* causes line 234*e* to be in the one state, the decode branch unit 234 is inhibited so that there will be no signal on line 234*a*. In such event the present address will be incremented in unit 244 and the operation will proceed in response to downstream of the conditional branch instruction.

The system of FIG. 5 will operate in accordance with the sequence of events set out in Table II in response to the sample program of Table I. A system clock 300 supplies clock pulses for control of the various units, in manner well known in the art, the clock pulses being noted in the top line of Table II.

The following description should be taken in conjunction with the information set forth in Table II where the instruction train includes the instructions indicated in Table I. The contents of address 103 constitutes a look-ahead instruction code. The specific look-ahead instruction at address 103 indicates that 18 instructions later the program stream will include a conditional branch instruction, i.e., at instruction 115. This instruction conditionally directs the computer to return to the instruction at address 103.

The operations shown in Table II involves only that part of the program stream which begins at a point at which the instruction words at addresses 100—107 containing the look-ahead instruction of Table I at address 103 has been loaded into the register file 129. Table II depicts the status of the various portions of the system after the occurrence of the clock pulses 1, 2, 3, etc. Thus the first 256-bit instruction word fetched from memory, which includes the eight instructions 100, 107, is loaded into the registers K00—K07 of the file 129. The second 256-bit instruction word containing eight instructions at addresses 107—10F fetched from memory is loaded into registers K10—K17 of the file 130.

After clock pulse 1, it will be noted that the present address register 224 will have been clocked sequentially from the beginning of the program one increment for each instruction transferred from register files 129—130. Thus as shown by Table II, the following conditions are found in the system of FIG. 5.

After clock pulse 1:

- the present address register 244 contains the address 103;
- the look-ahead address register 276 contains the look-ahead address 108;
- if the line 286 signals from memory that data is available so that the flip-flop 292 is in the one state, the output of the AND gate 213 is enabled so that the 256-bit word having addresses 108—10F may be transferred into the register file 130;
- if the state of the line 211 (LAI) is in the one state and the line 210 (LA0) is in the zero state;
- the output of AND gate 288 is in the one state so that the upper bank 215 of AND gates is enabled to be responsive to an output on one of the lines leading from the decode unit 218;
- the AND gate 290 is in the zero state so that the terminal PU1 is at the zero state whereby the bank 216 of AND gates will not be responsive to the output of the decode unit 218; and
- the decode unit 218 has decoded the last three bits of address 103 to produce a one state on the line leading to the AND gate connected to the register K03.

After clock pulse 2:

- the present address register 244 has been incremented to address 104;
- the AND gate leading from register K04 and file 129 is enabled by the decode unit 218;
- the present address 103 has been transferred from register

TABLE II

| Clock time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| W0 | 100 | | | | | | | | | | | | 110 | | | | | | | | | | | | | | |
| W1 | 101 | | | | | | | | | | | | 111 | | | | | | | | | | | | | | |
| W2 | 102 | | | | | | | | | | | | 112 | | | | | | | | | | | | | | |
| 120 W3 | 103 | | | | | | | | | | | | 113 | | | | | | | | | | | | | | |
| W4 | 104 | | | | | | | | | | | | 114 | | | | | | | | | | | | | | |
| W5 | 105 | | | | | | | | | | | | 115 | | | | | | | | | | | | | | |
| W6 | 106 | | | | | | | | | | | | 116 | | | | | | | | | | | | | | |
| W7 | 107 | | | | | | | | | | | | 117 | | | | | | | | | | | | | | |
| W0 | 108 | | | | | | | | | | | | | | | | | | | | 100 | | | | | | |
| W1 | 109 | | | | | | | | | | | | | | | | | | | | 101 | | | | | | |
| W2 | 10A | | | | | | | | | | | | | | | | | | | | 102 | | | | | | |
| 130 W3 | 10B | | | | | | | | | | | | | | | | | | | | 103 | | | | | | |
| W4 | 10C | | | | | | | | | | | | | | | | | | | | 104 | | | | | | |
| W5 | 10D | | | | | | | | | | | | | | | | | | | | 105 | | | | | | |
| W6 | 10E | | | | | | | | | | | | | | | | | | | | 106 | | | | | | |
| W7 | 10F | | | | | | | | | | | | | | | | | | | | 107 | | | | | | |
| PA | 103 | 104 | 105 | 106 | 107 | 108 | 109 | 10A | 10B | 10C | 10D | 10E | 10F | 110 | 111 | 112 | 113 | 114 | 115 | 116 | 117 | | 103 | 104 | 105 | 106 | |
| LA | 108 | | | | | 110 | | | | | | | | 100 | | | | | | | | 108 | | | | | |
| LA0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | |
| LA1 | 0 | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | |
| PU0 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | |
| PU1 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | |
| LA count | | | | 18 | 17 | 16 | 15 | 14 | 13 | 12 | 11 | 10 | 9 | 8 | 7 | 6 | 5 | 4 | 3 | 2 | 1 | | | | | 18 | |
| Branch | | | | 100 | | | | | | | | | | 100 | | | | | | | | | | | | 100 | |
| Decode | K03 | K04 | K05 | K06 | K07 | K10 | K11 | K12 | K13 | K14 | K15 | K16 | K17 | K00 | K01 | K02 | K03 | K04 | K05 | K06 | K07 0 | 0 | K13 | K14 | K15 | K16 | |
| Instruction Reg 1 (contents) | | 103 | 104 | 105 | 106 | 107 | 108 | 109 | 10A | 10B | 10C | 10D | 10E | 10F | 110 | 111 | 112 | 113 | 114 | 115 | 116 | 117 | | 103 | 104 | 105 | |
| PA-1 | | 103 | 104 | 105 | 106 | 107 | 108 | 109 | 10A | 10B | 10C | 10D | 10E | 10F | 110 | 111 | 112 | 113 | 114 | 115 | 116 | 117 | | 103 | 104 | 105 | |
| Instruction Reg 2 (contents) | | | 103 | 104 | 105 | 106 | 107 | 108 | 109 | 10A | 10B | 10C | 10D | 10E | 10F | 110 | 111 | 112 | 113 | 114 | 115 | 116 | | | 103 | 104 | |
| PA-2 | | | 103 | 104 | 105 | 106 | 107 | 108 | 109 | 10A | 10B | 10C | 10D | 10E | 10F | 110 | 111 | 112 | 113 | 114 | 115 | 116 | | | 103 | 104 | |
| Prelim decode | | | LLA | 0 | 0 | 0 | 0 | 0 | 0 | 0 | 0 | 0 | 0 | 0 | 0 | 0 | 0 | 0 | 0 | 0 | 0 | 0 | 0 | 0 | LLA | 0 | |
| Count value | | | 18 | | | | | | | | | | | | | | | | | | | | | | 18 | | |
| Instruction Reg 3 (contents) | | | | 103 | 104 | 105 | 106 | 107 | 108 | 109 | 10A | 10B | 10C | 10D | 10E | 10F | 110 | 111 | 112 | 113 | 114 | 115 | | | | 103 | |
| PA-3 | | | | 103 | 104 | 105 | 106 | 107 | 108 | 109 | 10A | 10B | 10C | 10D | 10E | 10F | 110 | 111 | 112 | 113 | 114 | 115 | | | | 103 | |

244 to register 222; and the contents of address 103 have been transferred from register K03 to instruction register 221.

After clock pulse 3:

the present address register 244 has been incremented to address 105 and the AND gate leading from register K05 in file 129 has been enabled to be responsive to the output of the decode unit 218;

the address 104 has been transferred from register 244 to register 222 and the contents of address 104 have been transferred to instruction register 221;

the address 103 has been transferred to register 227 and the contents at address 103 have been transferred to instruction register 224 and eight bits of the contents have been transferred by way of channels 225 to the preliminary decode unit 226;

in response to the preliminary decode unit 226, the AND gate 235 is enabled by a state of line 236 so that the preliminary decode unit provides the LLA (load look-ahead) signal on line 236; and the count value for the look-ahead signal is 18.

After clock pulse 4:

the present address register 244 has been incremented to the address 106;

the address 105 has been transferred from register 244 to register 221;

the contents at address 105 have been transferred to register 221;

address 104 appears in register 227 and the contents of that address appear in register 224;

the load look-ahead line 236 is in a zero state;

the address 103 has been transferred to register 230 and the contents of address 103 appear in register 229;

the look-ahead count unit 258 has been loaded with the count 18; and the branch register 274 has the address 100 therein; the least significant three bits of address 103 from register 227 not being used. The fourth clock pulse serves to load the address from register 227 into register 274.

After clock pulse 5:

the present address register 244 has been incremented to address 107, look-ahead count register 258 has been decremented to the count of 17;

decode unit 218 has energized one of its output lines to enable transfer of the contents of the register K07 in file 129;

register 222 contains address 106 and register 221 contains the contents of address 106;

register 227 contains address 105 and register 224 contains the contents of address 105;

load look-ahead line 236 is in zero state;

register 230 contains address 104 and register 229 contains the contents of address 104.

After clock pulse 6:

register 218 contains address 108;

look-ahead register 276 contains address 110, the same having been incremented by a count of 8 through unit 280 and gate 278;

line 210 is in the one state and line 211 is in the zero state;

AND gate 288 is now off and AND gate 290 is now enabled, so that terminal PU1 of the decode unit 218 is in the one state;

count unit 258 has been decremented to the count of 16;

decode unit 218 applies a one state to one of its output lines so that the top gate in bank 216 is enabled;

register 222 contains address 107 and register 221 contains the contents of address 107;

register 227 contains address 106 and register 224 contains the contents of address 106; and register 230 contains address 105 and register 229 contains the contents of address 105.

The above sequence then continues in the order shown in Table II and without significant change in logic until after clock pulse 13.

After clock pulse 13:

the file 129 contains addresses 110—117;

the register 244 has been clocked to address 10F; and the remainder of the system is as indicated in the column of clock pulse 13, Table II.

After clock pulse 14:

the register 244 has been clocked to address 110;

the look-ahead register 276 now contains the look-ahead address 100, this transfer being made in response to the appearance of one states in part of the last three bits of the register 244 and in response to the count in register 258, having reached a value less than or equal to 11 and above 3, the outputs of AND gate 266 and the count detector unit 262 having been applied to an AND gate 263 to enable AND gate 272 to transfer the branch address 100 from register 274 to register 276;

line 211 is in the one state and line 210 is in the zero state;

the terminals PU0 and PU1 of the decode unit 218 are in the one and zero states, respectively;

the count of unit 258 has been decremented to 8;

the branch register 276 contains the address 100; and the registers 221, 224 and 229 contain the contents of addresses 10F, 10E and 10D, respectively.

After clock pulse 21:

file 130 contains the contents of the addresses 100—107; and register 244 has been incremented so that it contains the address 117.

After clock pulse 22:

register 244 has been cleared;

the look-ahead address in register 276 is address 108;

line 210 is in the one state and line 211 is in the zero state;

terminals PU0 and PU1 of decode unit 218 are in the zero and one states, respectively;

the count unit 258 has been reset to zero;

register 222 contains address 117 and register 221 contains the contents of address 117;

register 227 contains address 116 and register 224 contains the contents of address 116;

register 230 contains address 115 and register 229 contains the contents of address 115.

After clock pulse 23:

register 244 contains the address 103, the same having been applied by way of indexer 231 and effective address unit 232;

the output gate 242 from unit 232 is enabled by a signal from the decode branch unit 234 to transfer into the register 244 the correct present address; and the output of the decode unit 218 enables one line applied to the AND gate leading from the register for word K13.

Following clock pulse 23, the sequence of operations repeats itself through the conditional loop until the condition is satisfied whereupon the computer will then progress downstream beyond clock pulse 18, Table I.

From the foregoing it will be seen that a logic system is to be interposed in the channel 33, FIG. 4, between memory and the arithmetic unit of the CPU to accommodate the insertion into the instruction stream of look-ahead instructions, as needed, each followed by a conditional branch instruction.

While the preferred embodiment of the invention involves logic circuits indicated in FIG. 5 as fixed computer hardware, it will be understood that a computer module could be inserted and programmed to carry out the functions which, in FIG. 5, are in hardware form.

It will be recognized that the register 230 serves the same function in the present system as the program counter serves in a classical computer configuration.

The operation of the system is based upon the presence of three instructions registers 221, 224 and 229, one of which provides one pipeline level to get ahead of the CPU and two levels to permit instruction processing in the look-ahead mode. When the present address in register 244 advances from an address in one block of 8 memory words to the next block of 8 memory words and the count in the look-ahead counter 258 is a block length or less plus the number (3) of time levels of instruction processing then the address of the look-ahead instruction stored in the branch register 274 is transferred to the look-ahead register 276. The latter information is transmitted by way of channels 277 to memory, whereby the block containing the last look-ahead instruction is fetched.

Thus in accordance with the preferred embodiment of the invention an instruction pipeline comprising at least three levels is interposed between memory and a central processor and includes a plurality of decoders one of which decodes at one level a look-ahead instruction and at a later level a conditional branch instruction and a third of which decodes the present address for control of fetching instructions from memory to the pipeline. The fetched decoder serves to establish conditions including a preset count which count changes monotonically with each instruction entering the pipeline. Means are provided for replacing the present address with a look-ahead address and for signaling return to the instruction stream at the location of the look-ahead address when the monotonic change equals the preset count with means for directing instruction flow beyond the conditional branch when the branch conditions are met.

Having described the invention in connection with certain specific embodiments thereof, it is to be understood that further modifications may now suggest themselves to those skilled in the art and it is intended to cover such modifications as fall within the scope of the appended claims.

We claim:

1. A look-ahead system for a digital computer having program instructions stored in and retrievable from a memory which comprises:

a. instruction processing means through which an instruction stream from said memory may be passed seriatim;

b. a first preliminary decoder for sensing a look-ahead instruction in said instruction stream;

c. a counter having means for response to said first preliminary decoder for establishing an index and means for changing said index decrementally upon appearance of each subsequent instruction;

d. a second decoder operable in the instruction stream following said first decoder for sensing a conditional branch instruction;

e. a present address register;

f. a third decoder responsive to the contents of said present address register for enabling the supply of instructions seriatim to said instruction processing means;

g. a look-ahead address register; and h. a branch register responsive to predetermined conditions in said present address register and of the index in said counter for establishing in said look-ahead address register the address in said memory of said look-ahead instruction in said instruction stream for repeat of the fetch thereof from memory.

2. The combination set forth in claim 1 wherein means are provided operable upon satisfying the condition of said conditional branch instruction for inhibiting said second decoder.

3. A look-ahead system for a digital computer having program instructions stored in and retrievable from a memory which comprises:

a. a preliminary instruction processing pipeline including at least three storage levels through which instructions from memory may be passed seriatim;

b. a preliminary decoder operable at a preliminary decode level of said pipeline for sensing a look-ahead instruction in said instruction stream;

c. a counter responsive to a look-ahead instruction at said preliminary decode level for establishing an index;

d. a branch decoder operable at a level following said preliminary decode level for sensing a conditional branch instruction;

e. a present address register;

f. a present address decoder responsive to the contents of said present address register for enabling the supply of instructions seriatim to the first level of said pipeline;

g. a look-ahead address register for control of ordered fetch of instructions from memory; and h. a branch register responsive to predetermined conditions in said present address register and of the index in said counter for transferring from said pipeline to said look-ahead address register a code for the address of said look-ahead instruction for repeat of the fetch thereof from memory.

4. A look-ahead system for a digital computer responsive to a look-ahead instruction followed by a conditional branch instruction in the instruction stream retrievable from a memory which comprises:

a. a branch register connected to receive and store the address of a look-ahead instruction;

b. a look-ahead count storage means which decrements upon fetching each instruction located in the instruction stream between a look-ahead instruction and a conditional branch instruction;

c. a present address register to store the address of the instruction currently being fetched to said pipeline;

d. a look-ahead register connected to receive and store the address of a block of instructions in said instruction stream following a like block containing the present address and connected to receive the contents of said branch register;

e. a transfer means responsive to the count of said storage means to transfer the look-ahead instruction address from said branch register to said look-ahead address register; and f. means responsive to the appearance of said look-ahead address in said look-ahead register for fetching the block of instructions from memory which includes said look-ahead instruction.

5. A look-ahead system for a digital computer having a look-ahead instruction in a program instruction stream stored in a memory and retrievable from memory in like blocks of plural instructions for use by a processing unit which comprises:

a. an instruction pipeline having a plurality of instruction registers for transferring instructions to a central processing unit;

b. a pair of banks of storage registers connected in parallel between said memory and said pipeline for receiving and storing two of said blocks of instructions;

c. a present address register for storing a present address;

d. a decode unit for controlling transfer of instructions from said banks serially to said pipeline responsive to a series of predetermined conditions in said present address register;

e. a look-ahead address register, containing a look-ahead instruction address, responsive to one condition of said series of predetermined conditions in said present address register for incrementing the look-ahead address in increments equal to the number of instructions in each said block of instructions;

f. a look-ahead counter which is decremented upon the transferring from one of said banks of each instruction located in the instruction stream following a look-ahead instruction, said counter having first been set to a predetermined count by the sensing of said look-ahead instruction;

g. a branch register connected to said pipeline to receive and store the address of said look-ahead instruction; and h. means responsive to a second predetermined count in said counter and to another condition in said series of predetermined conditions in said present address register for transferring the address of said look-ahead instruction from said branch register to said look-ahead address register for repeating the fetch of said look-ahead and subsequent instructions from said memory.

6. The combination set forth in claim 5 wherein said pipeline includes three levels of storage registers and wherein means are provided for storing at the first said level the address stored in said present address register.

7. The combination set forth in claim 5 wherein logic means interconnects said look-ahead address register and said present address register to enable transfer of an address from said branch register to said look-ahead register only when said one condition of said series of predetermined conditions in said present address register indicates the number of instructions in each said block of instructions.